US012367770B2

(12) United States Patent
Suzuki et al.

(10) Patent No.: US 12,367,770 B2
(45) Date of Patent: Jul. 22, 2025

(54) VEHICLE ALLOCATION SUPPORT DEVICE, VEHICLE ALLOCATION SUPPORT METHOD, AND NON-TRANSITORY COMPUTER-READABLE STORAGE MEDIUM STORING VEHICLE ALLOCATION SUPPORT PROGRAM

(71) Applicants: Nissan Motor Co., Ltd., Kanagawa (JP); RENAULT S.A.S., Boulogne-Billancourt (FR)

(72) Inventors: Masayasu Suzuki, Kanagawa (JP); Youhei Kaneko, Kanagawa (JP); Natsu Takahashi, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 159 days.

(21) Appl. No.: 18/283,630

(22) PCT Filed: Mar. 22, 2021

(86) PCT No.: PCT/IB2021/000179

§ 371 (c)(1),
(2) Date: Sep. 22, 2023

(87) PCT Pub. No.: WO2022/200818

PCT Pub. Date: Sep. 29, 2022

(65) Prior Publication Data

US 2024/0169837 A1 May 23, 2024

(51) Int. Cl.
*G08G 1/123* (2006.01)
*G08G 1/0967* (2006.01)
*G08G 1/00* (2006.01)

(52) U.S. Cl.
CPC ....... *G08G 1/123* (2013.01); *G08G 1/096725* (2013.01)

(58) Field of Classification Search
CPC .... G08G 1/123; G08G 1/00; G08G 1/096725; G08G 1/202
(Continued)

(56) References Cited

U.S. PATENT DOCUMENTS

2019/0041864 A1* 2/2019 Konishi ............ G06Q 10/0832
2019/0066516 A1 2/2019 Kuhara
(Continued)

FOREIGN PATENT DOCUMENTS

CN 109426257 A 3/2019
CN 110741422 A 1/2020
(Continued)

*Primary Examiner* — Tan Q Nguyen
(74) *Attorney, Agent, or Firm* — Osha Bergman Watanabe & Burton LLP

(57) ABSTRACT

A vehicle allocation support device: acquires baggage information about baggage carried in a vehicle; acquires user information that includes at least user position information indicating a current position of a user or destination information indicating a scheduled destination of the user; acquires vehicle information including vehicle position information indicating a position of the vehicle; specifies a usage area in which the baggage is to be used, based on an estimated usage place that is information corresponding to the baggage and in which the baggage is estimated to be used and one of the user information and the vehicle information; and determines a vehicle allocation route for allocating the vehicle to at least the current position of the user, the scheduled destination of the user, or the usage area, based on a positional relationship between the usage area and one of the user position information and the scheduled destination information.

15 Claims, 11 Drawing Sheets

(58) Field of Classification Search
USPC .......................................................... 701/117
See application file for complete search history.

(56) References Cited

U.S. PATENT DOCUMENTS

| | | | | |
|---|---|---|---|---|
| 2019/0130343 | A1* | 5/2019 | Taguchi | G06Q 10/083 |
| 2019/0180233 | A1 | 6/2019 | Kadotani et al. | |
| 2019/0180628 | A1* | 6/2019 | Hayashi | G06Q 10/083 |
| 2020/0104964 | A1 | 4/2020 | Yasui et al. | |
| 2020/0159251 | A1 | 5/2020 | Iwasaki et al. | |
| 2020/0279195 | A1 | 9/2020 | Kobori et al. | |
| 2020/0310438 | A1* | 10/2020 | Suzuki | G05D 1/0212 |

FOREIGN PATENT DOCUMENTS

| | | | |
|---|---|---|---|
| CN | 110741423 | A | 1/2020 |
| EP | 3447720 | A1 | 2/2019 |
| JP | 6341352 | B1 | 6/2018 |
| JP | 2019-040587 | A | 3/2019 |
| JP | 2019-105926 | A | 6/2019 |
| JP | 2020-074181 | A | 5/2020 |
| JP | 2020-098610 | A | 6/2020 |
| JP | 2020-160708 | A | 10/2020 |
| JP | 2020-166754 | A | 10/2020 |
| WO | 2018/230679 | A1 | 12/2018 |
| WO | 2018/230738 | A1 | 12/2018 |
| WO | 2019/106745 | A1 | 6/2019 |

* cited by examiner

FIG. 5

| BAGGAGE | ESTIMATED USAGE PLACE |
|---|---|
| BODY BOARD | SWIMMING BEACH |
| SIMPLE TENT | SWIMMING BEACH, PARK |
| ... | ... |

FIG. 6

| USER ID NUMBER | DEPARTURE PLACE (SCHEDULED TIME) | ALIGHTING POINT (SCHEDULED TIME) | WAYPOINT (SCHEDULED TIME) | FINAL DESTINATION (SCHEDULED TIME) |
|---|---|---|---|---|
| 100001 | POINT 1 (8:00) | POINT 2 (9:00) | POINT 3 (13:00)<br>POINT 4 (15:30-16:00) | POINT 5 (17:00) |

FIG. 11

| TYPE OF SERVICE VEHICLE | BAGGAGE | ESTIMATED USAGE PLACE |
|---|---|---|
| SALES VEHICLE | FOOD, LUNCH BOX | SWIMMING BEACH, BBQ SITE, FISHING SPOT |
| | EXTRA CLOTHES | SWIMMING BEACH, BBQ SITE |
| | FISHING BAIT | FISHING SPOT |
| RENTAL PRODUCT SUPPLY VEHICLE | PARASOL | SWIMMING BEACH, BBQ SITE, FISHING SPOT |
| | SWIMSUIT | SWIMMING BEACH |
| | FLOAT | SWIMMING BEACH |
| | SIMPLE TENT | SWIMMING BEACH, BBQ SITE, FISHING SPOT |
| | SHOVEL FOR SHELLFISH GATHERING | SWIMMING BEACH, FISHING SPOT |
| ... | ... | ... |

VEHICLE ALLOCATION SUPPORT DEVICE, VEHICLE ALLOCATION SUPPORT METHOD, AND NON-TRANSITORY COMPUTER-READABLE STORAGE MEDIUM STORING VEHICLE ALLOCATION SUPPORT PROGRAM

TECHNICAL FIELD

The present invention relates to a vehicle allocation support device, a vehicle allocation support method, and a vehicle allocation control program.

BACKGROUND ART

Services have been proposed for picking up an occupant of a vehicle and dropping off the occupant at a destination of the occupant, and delivering baggage carried in the vehicle to a delivery location of the baggage. For example, Patent Literature 1 discloses a vehicle allocation device for a combined service that combines pickup and drop-off of the occupant and delivery of the baggage performed by an autonomous vehicle. The autonomous vehicle allocated by the vehicle allocation device picks up a user (occupant) together with the baggage, drops off the user at the destination, and delivers the baggage to a delivery location after the user has alighted at the destination. According to the vehicle allocation device, for example, when a user who has arrived at an airport stops at a tourist site (destination) before checking in at a hotel, the user alights at the tourist site (destination) and the baggage is delivered to the hotel that is the delivery location.

CITATION LIST

Patent Literature

Patent Literature 1: Japanese Unexamined Patent Application Publication No. 2019-105926

SUMMARY OF INVENTION

Technical Problem

However, according to the vehicle allocation device in Patent Literature 1, in a case where the user wishes to use the baggage in the middle of the route after alighting from the autonomous vehicle at the destination, the user needs to move to the delivery location of the baggage to pick up the baggage, and to move again together with the baggage to the place where the user wishes to use the baggage. In other words, in a case where the user who has alighted from the autonomous vehicle needs to use the baggage in the middle of the route, the user is required to go to the delivery location to pick up the baggage (extra effort), which consumes wasteful energy.

The present invention has been made in view of the above problem, and an object of the present invention is to provide a vehicle allocation support device, a vehicle allocation support method, and a vehicle allocation support program that allow a user to receive baggage from a vehicle at a place where the user is to use the baggage when the user is likely to use the baggage carried in the vehicle.

Solution to Problem

A vehicle allocation support device according to an aspect of the present invention includes a baggage information acquisition unit, a user information acquisition unit, a vehicle information acquisition unit, a usage area specifying unit, and a vehicle allocation determination unit. The baggage information acquisition unit acquires baggage information about baggage carried in a vehicle. The user information acquisition unit acquires user information that is information about a user and includes at least user position information indicating a current position of the user or destination information indicating a scheduled destination of the user. The vehicle information acquisition unit acquires vehicle information that includes vehicle position information indicating a position of the vehicle. The usage area specifying unit specifies a usage area in which the baggage is to be used, based on the baggage information, and the user information or the vehicle information. The vehicle allocation determination unit determines a vehicle allocation route for allocating the vehicle to at least the current position of the user, the scheduled destination of the user, or the usage area, based on a positional relationship between the usage area and one of the user position information and the scheduled destination information.

Advantageous Effects

An aspect of the present invention makes it possible to provide a vehicle allocation support device that allows a user to receive baggage from a vehicle at a place where the user is to use the baggage when the user is likely to use the baggage carried in the vehicle.

BRIEF DESCRIPTION OF DRAWINGS

FIG. 5 is a diagram illustrating an example of baggage information according to the first embodiment.

FIG. 6 is a diagram illustrating an example of user information according to the first embodiment.

FIG. 11 is a diagram illustrating an example of baggage information according to the second embodiment.

DESCRIPTION OF EMBODIMENTS

Figure 1:
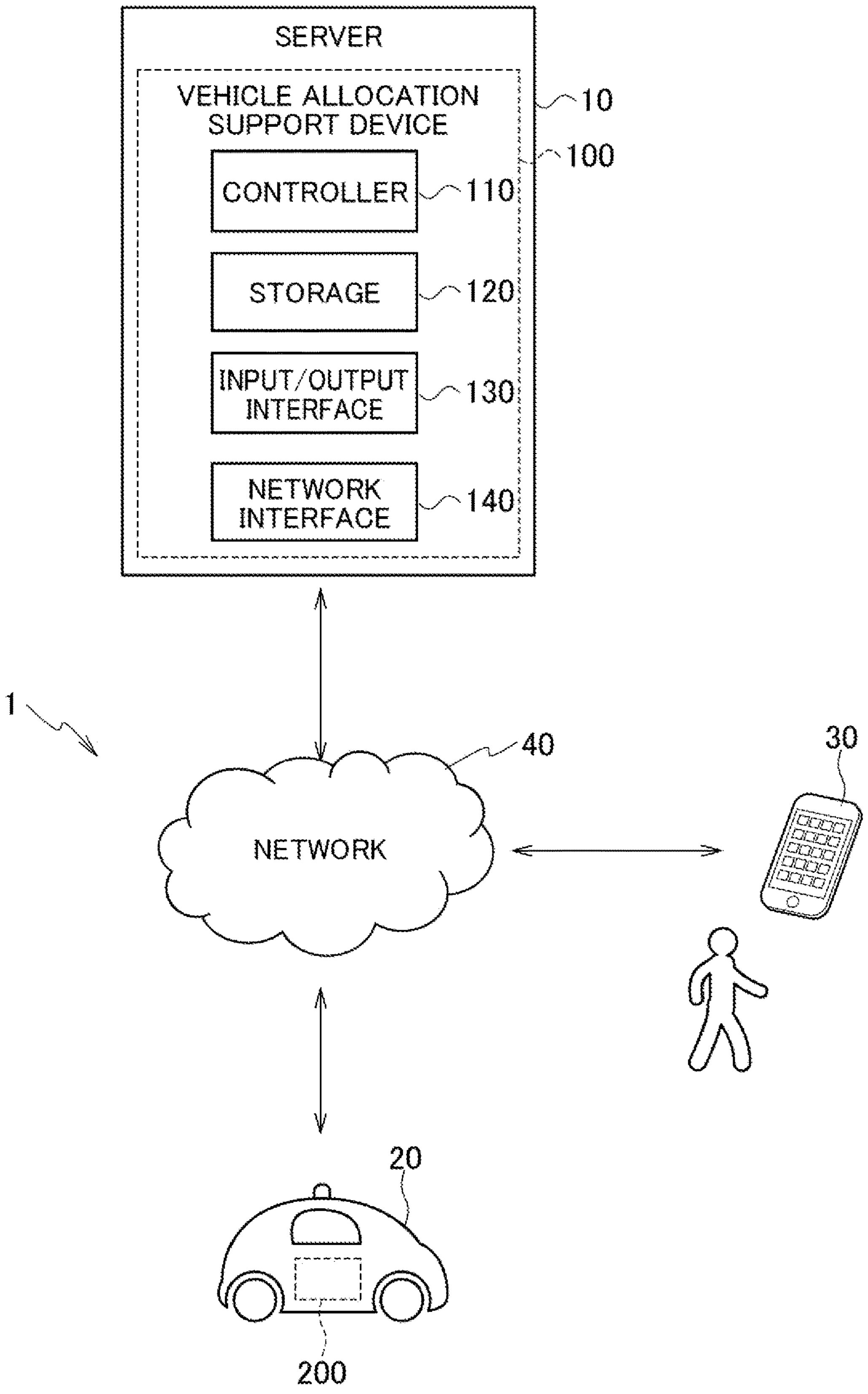
FIG. 1 is a diagram illustrating a schematic configuration of a vehicle allocation support system 1 according to the present embodiment.

Embodiments will be described with reference to the drawings. In the description of the drawings, the same components are denoted by the same reference numerals and a description thereof of will be omitted.

(Outline of Vehicle Allocation Support System 1)

A vehicle allocation support system 1 is a system that delivers baggage to a user when the user is to use the baggage carried in a vehicle. The vehicle allocation support system 1 using a vehicle allocation support device 100 will be described below with reference to some specific examples.

First Embodiment

The configuration of the vehicle allocation support system 1 according to a first embodiment will be described with reference to FIG. 1. The vehicle allocation support system 1 includes a server 10, a vehicle 20, a user terminal 30, and a network 40.

In the present embodiment, the server 10 is provided with a vehicle allocation support device 100. As illustrated in FIG. 1, the vehicle allocation support device 100 includes: a controller 110; a storage 120; an input/output interface (IF) 130; and a network interface (IF) 140. The server 10 exchanges data between the vehicle 20 and the user terminal 30 via the network 40. It should be noted that the configuration of the vehicle allocation support device 100 illustrated in FIG. 1 is merely an example and the present invention is not limited thereto. For example, the server 10 can be replaced with one or more computers that can perform each function performed in the controller 110. The details of the controller 110 and the storage 120 will be described later.

The input/output interface (IF) 130 is, for example, a component (interface) for a user using the server 10 to exchange data with the server 10, and includes, for example, an input unit and an output unit.

The input unit has an interface function for inputting various information performed by the user, and has various information input from outside the server 10. The user inputs information into the input unit by way of, for example, a keyboard, a mouse, a touch panel, a trackball, and a speech recognition device each connected to the server 10. The user can also input information into the input unit serving as a data input terminal for inputting data from an external storage device (not illustrated) or the like.

The output unit causes a display device (not illustrated) connected to the server 10 to display various types of information. The display device is, for example, a projector device or the like.

The network interface (IF) 140 is an interface for performing communication between the vehicle 20 and the user terminal 30 via a wired and/or a wireless network.

The vehicle 20 is provided with an electronic controller 200. The electronic controller 200 includes a controller, a storage, and a network interface (IF), and is a computer to control the traveling of the vehicle 20. The electronic controller 200 is communicably connected to the server 10 via the network 40. The vehicle 20 may be an autonomous vehicle. An autonomous vehicle is a vehicle provided with an autonomous driving system that automatically drives the vehicle toward a prescribed destination. That is, an autonomous vehicle travels automatically without the driver having to perform any driving operations. The vehicle 20 is also provided with a global positioning system (GPS) device (not illustrated).

The GPS device detects the position information of the vehicle 20 and transmits the detected position information to the electronic controller 200. The GPS device receives radio waves from a plurality of GPS satellites by using a GPS antenna (not illustrated), performs prescribed calculation processing to acquire latitude and longitude information representing the current position of the vehicle 20 from the received signals, and stores the acquired information in the storage of the electronic controller 200 as the position information of the vehicle 20. The controller of the electronic controller 200 also transmits the position information of the vehicle 20 stored in the storage to the server 10 via the network interface (IF) at a prescribed timing.

The user terminal 30 is, for example, a smartphone and is usually operated by the user. The user terminal 30 may be a mobile device such as a tablet or a laptop. Although not illustrated, the user terminal 30 is a computer including a controller, a storage, and a network interface (IF). Therefore, the user terminal 30 can communicate with the server 10 via the network 40. In addition, the user terminal 30 may be provided with a GPS receiver.

The network 40 is a communication network in which the server 10, the vehicle 20 and the user terminal 30, can communicate with each other, and is, for example, the Internet, or a carrier network that is a mobile phone network.

(Example of Vehicle Allocation Support System 1)

Figure 2:
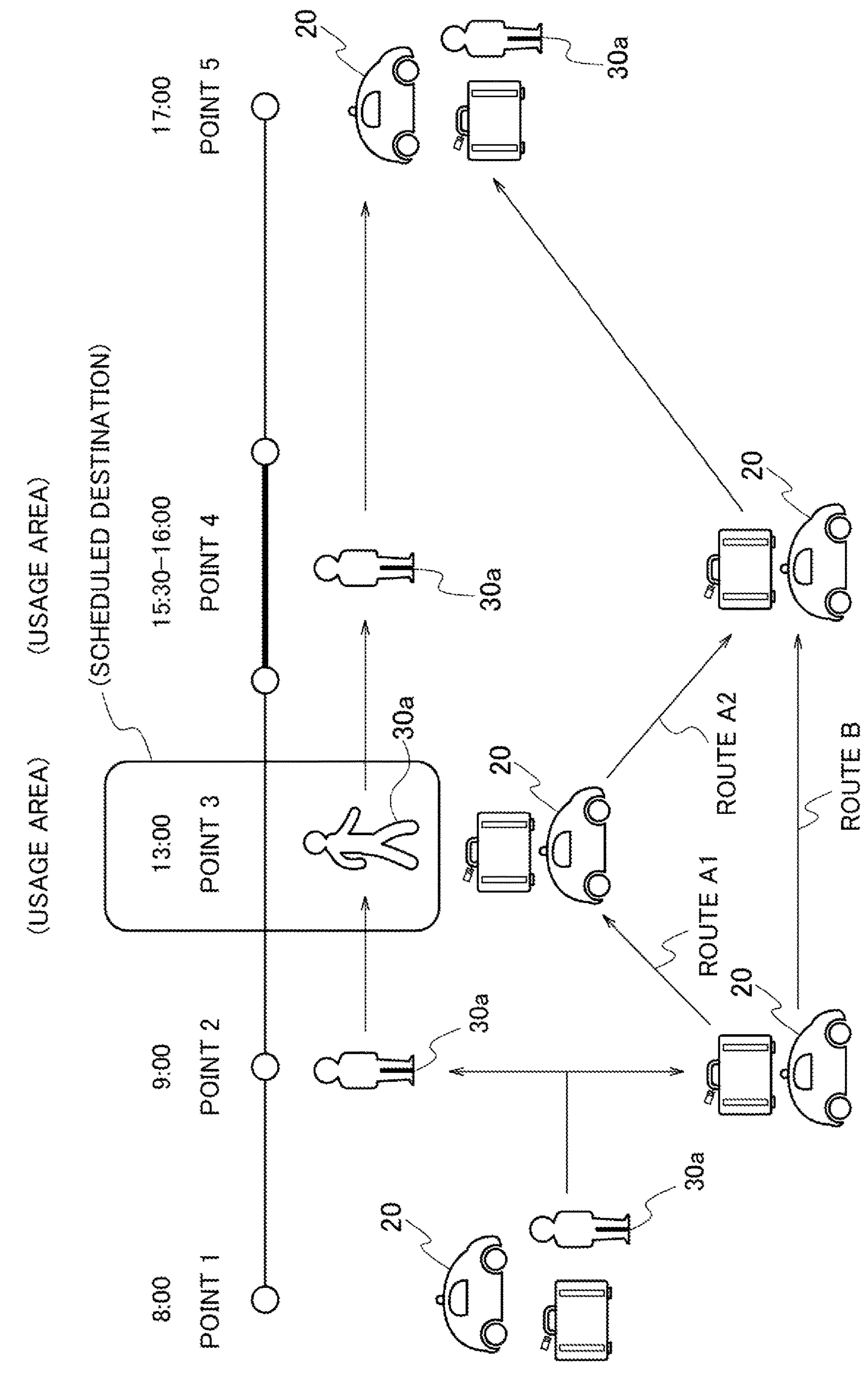
FIG. 2 is a diagram for explaining a vehicle allocation service using the vehicle allocation support system 1.

FIG. 2 is a diagram for explaining a usage example of a vehicle allocation support service using the vehicle allocation support system 1. In the example illustrated in FIG. 2, a user 30*a* boards the vehicle 20 together with baggage at "point 1" at 8:00. Thereafter, the user 30*a* alights from the vehicle 20 at "point 2" at 9:00. At this time, the baggage is carried in the vehicle 20. The user 30*a* and the vehicle 20, which were separated at point 2" at 9:00, move on different routes to arrive at "point 5", which is the final destination, at 17:00.

The user 30*a* illustrated in FIG. 2 is scheduled to stop at "point 3" at 13:00 and stop at "point 4" between 15:30 and 16:00 on the way to "point 5" which is the final destination. That is, in the example illustrated in FIG. 2, the user 30*a* alights at "point 2" and then heads for "point 5", which is the final destination, via "point 3" and "point 4". In the first embodiment, the scheduled destination is the place (destination) at which the user is scheduled to stop, and in the example illustrated in FIG. 2, "point 3" and "point 4" are estimated as the scheduled destinations.

The vehicle 20 travels to "point 5" that is the final destination according to the allocation instruction from the vehicle allocation support device 100 of the server 10. In route B illustrated in FIG. 2, the vehicle 20 travels to the final destination without converging with the user 30*a*. In contrast, in routes A1 and A2 illustrated in FIG. 2, an example is given in which the vehicle 20 converges with the user 30*a* at "point 3" on the way and the baggage is transferred to the user 30*a* at "point 3. The vehicle 20 also receives an allocation instruction (route instruction) from the server 10 so as to travel near the user 30*a* within a range in which it is possible to arrive at the final destination at the scheduled time. This makes it possible for the user 30*a* to receive the baggage at a desired timing when the user 30*a* needs to use the baggage.

As described above, the vehicle allocation support system 1 is a system that makes it possible for the vehicle 20, which is to deliver the baggage to the final destination after the user has alighted, to transfer the baggage to the user on the way in response to an allocation instruction from the server 10.

Figure 3:
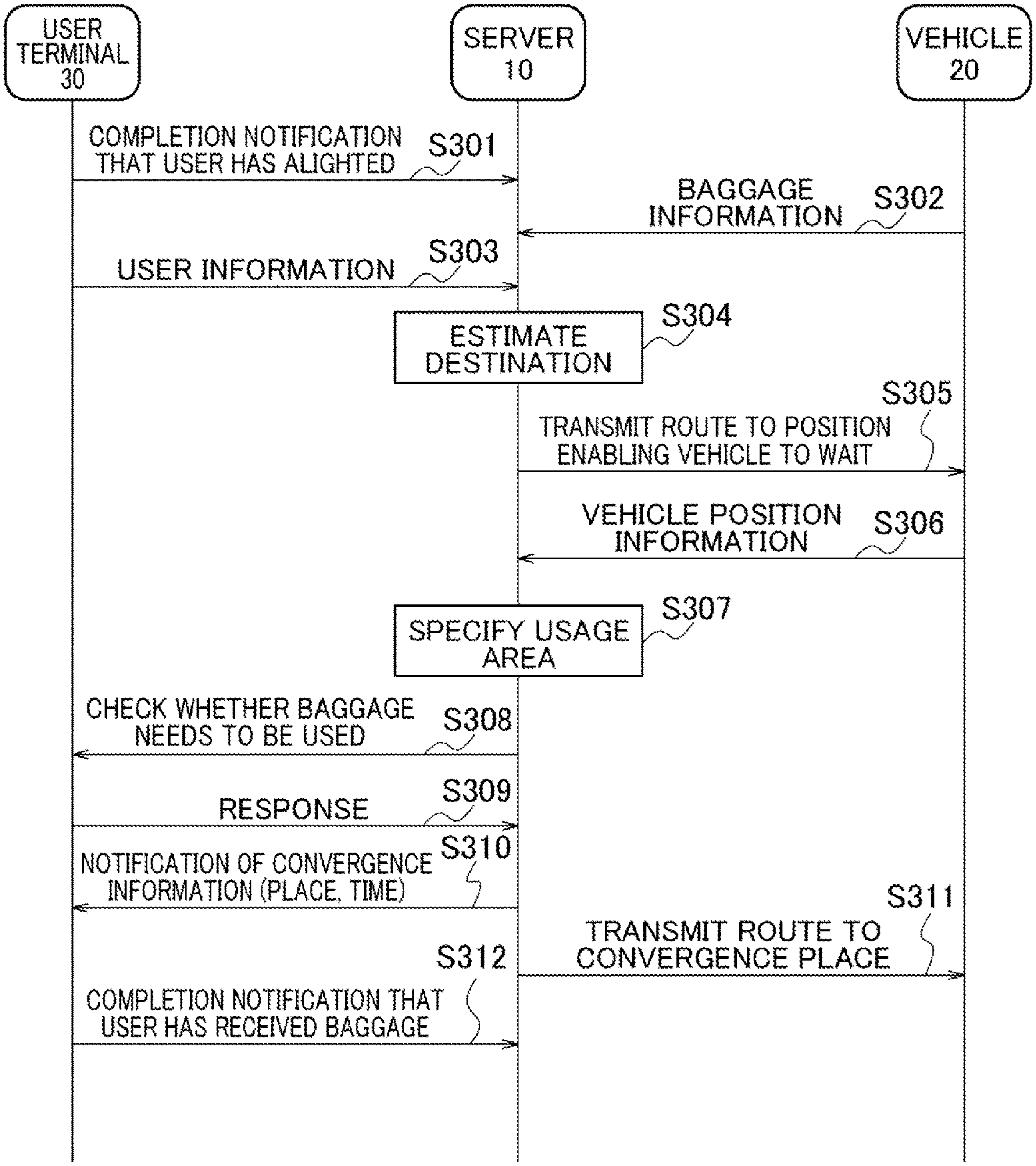
FIG. 3 is a sequence diagram for explaining the processing of the vehicle allocation support system 1 according to the first embodiment.

Next, an outline of the processing in the vehicle allocation support system 1 according to the first embodiment will be described with reference to a sequence diagram illustrated in FIG. 3. Here, an outline of the service in the vehicle allocation support system 1 according to the first embodiment will be described with reference to the diagram illustrating the usage example of FIG. 2, and the details of the processing in the vehicle allocation support device 100 will be described later with reference to FIG. 4.

In step S301, the user terminal 30 transmits a completion notification that the user has alighted, to the server 10. For example, as illustrated in FIG. 2, the user terminal 30 transmits a completion notification that the user has alighted when the user alights at "point 2" at 9:00. The completion notification that the user has alighted is not limited to the configuration of being notified from the user terminal 30, and may be notified from the electronic controller 200 of the vehicle 20, for example.

In step S302, the vehicle 20 transmits the baggage information about the baggage carried in the vehicle 20. In this respect, the baggage information transmitted from the vehicle 20 may be transmitted before the user alights. For example, as illustrated in FIG. 2, the baggage information may be transmitted from the vehicle 20 when the user boards the vehicle 20 together with the baggage at "point 1". The baggage information is not limited to the configuration of being transmitted from the vehicle 20, and a configuration may be adopted in which the user transmits the baggage information to the server 10 via the user terminal 30, for example. How the baggage information is acquired in the vehicle 20 will be described later in detail.

In step S303, user information is transmitted from the user terminal 30. The user information is information about the user using the baggage and at least includes user position information indicating the current position of the user or destination information indicating a scheduled destination of the user.

In step S304, the server 10 estimates the scheduled destination of the user. For example, as illustrated in FIG. 2, at a certain timing (e.g., around 12:00) the scheduled destination of the user is estimated to be "point 3", and at a later timing (e.g., around 15:00) the scheduled destination of the user is estimated to be "point 4". That is, at a certain timing, the scheduled destination estimated in step S307 is estimated to be the place where the user is likely to stop next.

In step S305, the server 10 transmits, to the vehicle 20, a route to a position that enables the vehicle 20 to wait. Specifically, based on the user information acquired in step S303, the server 10 transmits, to the vehicle 20, a route to a position that enables the vehicle 20 to wait in the vicinity of the current position of the user or the scheduled destination of the user. In this respect, when the vehicle 20 is positioned in the vicinity of the current position of the user, the vehicle 20 need not stop at a place that enables the vehicle 20 to wait, and the vehicle 20 may move as the user moves. That is, the server 10 transmits an appropriate route to the vehicle 20 such that the vehicle 20 keeps traveling at a close distance to the user.

In step S306, the vehicle 20 transmits the vehicle position information of the vehicle 20 to the server 10. The vehicle position information is transmitted to the server 10 at prescribed intervals as described above. In addition, the vehicle position information may be transmitted before the completion notification that the user has alighted that is executed in step S301, for example.

In step S307, the server 10 specifies a usage area of the baggage carried in the vehicle 20. In the present embodiment, a usage area is an area where it is presumed that the baggage will be used, and also an area that corresponds to the activity of the user using the baggage (current position or scheduled destination) or to information about the vehicle 20. For example, as illustrated in FIG. 2, in a case where the baggage is a "body board" and the user 30*a* is expected to move to "point 3" or "point 4" as the scheduled destination, a seaside area such as "point 3" or "point 4" is specified as a usage area.

In step S308, the server 10 checks with the user terminal 30 whether or not the baggage needs to be used. For example, as illustrated in FIG. 2, the server 10 inquires with the user as to whether or not the "body board" will be used at "point 3".

In step S309, a response as to whether or not the user will use the baggage is transmitted from the user terminal 30.

In step S310, the server 10 notifies the user terminal 30 of convergence information. Here, the convergence information is, for example, where and when the user and the vehicle 20 will converge with each other. In addition, the convergence information may include the baggage information about the baggage to be delivered to the user. The convergence information is notified in step S310 when the user responds in step S309 that the user wishes to use the baggage. Therefore, when the user responds in step S309 that the user does not wish to use the baggage, step S310 and step S312 which will be described later are not executed.

In step S311, the server 10 transmits a route to the convergence place with the user, to the vehicle 20. For example, as illustrated in FIG. 2, information about route A1 is transmitted to the vehicle 20. When a response from the user in step S309 indicates that the user will not use the baggage, the transmission of the route information in step S311 is not for a route to the place where the vehicle 20 converges with the user, but for a route in which the vehicle 20 keeps traveling at a certain distance to the user. For example, when the user and the vehicle 20 are not to converge with each other, information about route B illustrated in FIG. 2 is transmitted to the vehicle 20.

In step S312, the user terminal 30 transmits a notification to the server 10 that the user has received the baggage at the place where the user has converged with the vehicle 20. In this respect, the notification that the user has received the baggage is not limited to the configuration in which the user terminal 30 transmits a notification to the server 10. For example, a configuration may be adopted in which the vehicle 20 determines that the baggage has been delivered, and the vehicle 20 transmits a notification to the server 10 that the baggage has been delivered.

Next, the details of the functions of the vehicle allocation support device 100 that makes the route determination described above will be described.

(Functional Configuration of Vehicle Allocation Support Device 100)

Figure 4:
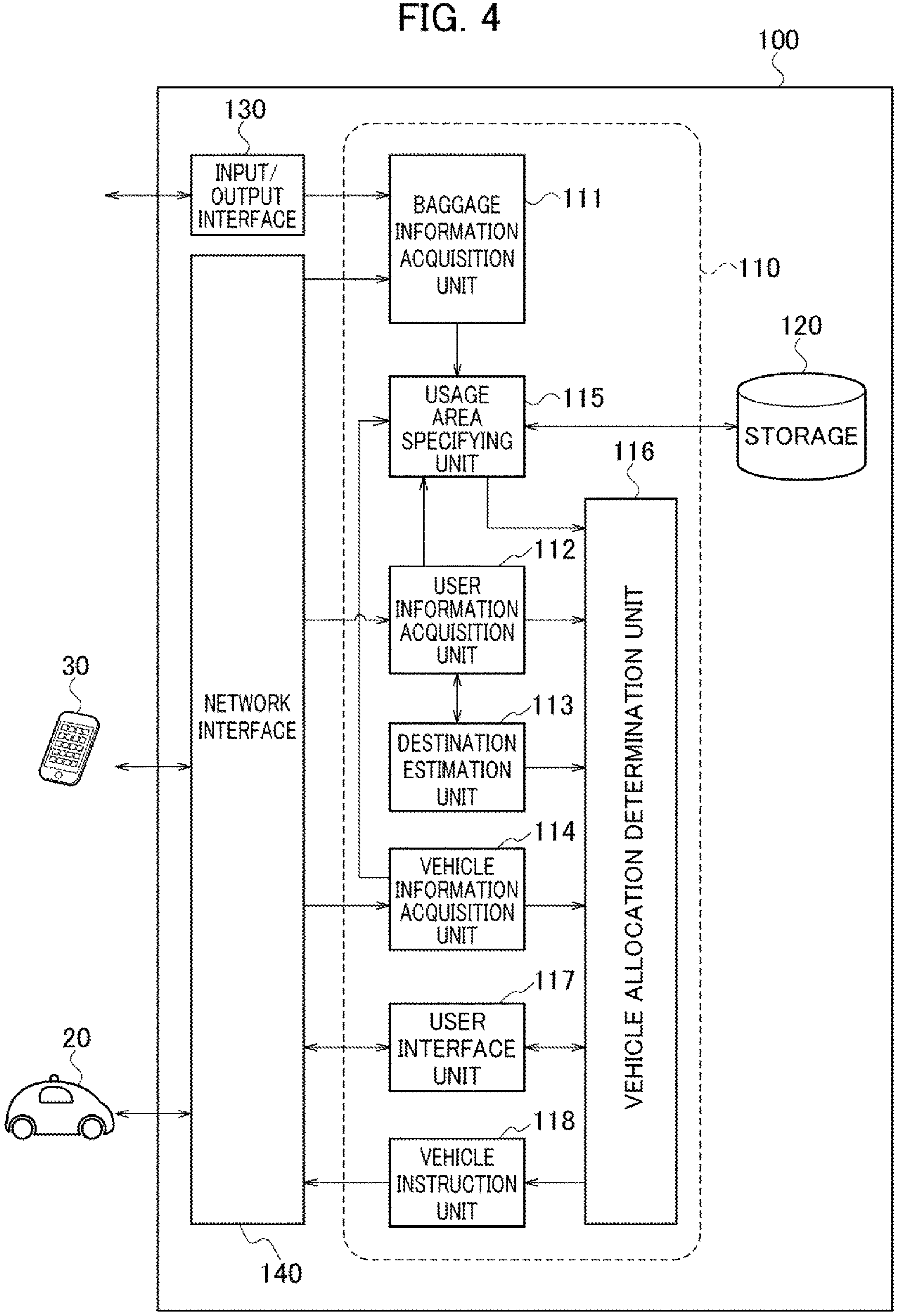
FIG. 4 is a functional block diagram for explaining the functions of a vehicle allocation support device 100.

FIG. 4 is a functional block diagram for explaining the functions of the vehicle allocation support device 100. The functions of the vehicle allocation support device 100 will be described using the functional block diagram illustrated in FIG. 4.

As illustrated in FIG. 4, the controller 110 includes, as functions, a baggage information acquisition unit 111, a user information acquisition unit 112, a destination estimation unit 113, a vehicle information acquisition unit 114, a usage area specifying unit 115, a vehicle allocation determination unit 116, a user interface (IF) unit 117, and a vehicle instruction unit 118. The controller 110, for example, operates an operation system to control the entire server 10. Further, the controller 110 operates on the basis of a program (not illustrated) stored in the storage 120 to execute each of the functions described above. The program is not limited to one stored in the storage 120, and may be stored, for example, in a ROM or the like (not illustrated) in the vehicle allocation support device 100.

The baggage information acquisition unit 111 acquires the baggage information about the baggage carried in the vehicle 20. Specifically, the baggage information acquisition unit 111 receives the baggage information acquired in the vehicle 20, via the network 40. The vehicle 20 acquires an image of the baggage using, for example, a camera installed in the vehicle 20, and recognizes the contents of the baggage and transmits the recognized contents as the baggage information to the vehicle allocation support device 100 of the server 10. The vehicle 20 may acquire the baggage information by means other than a camera. For example, when the baggage is carried in the vehicle 20, a tag for determining the type of baggage may be attached to the baggage in advance, and the information may be acquired from the tag by a tag reader (not illustrated) installed in the vehicle 20. Further, when using a service, the vehicle allocation support device 100 may have a configuration in which the user inputs the baggage information using the user terminal 30 and the baggage information is transmitted from the user terminal 30 to the vehicle allocation support device 100 to thereby be received in the baggage information acquisition unit 111. Further, when using a service, the vehicle allocation support device 100 may have a configuration in which the user directly inputs the baggage information in the server 10 for the baggage information to be acquired in the baggage information acquisition unit 111 via the input/output interface (IF) 130.

The user information acquisition unit 112 acquires the user information, which is the information about the user using the baggage and includes at least the user position information indicating the current position of the user or the destination information indicating a scheduled destination of the user. Specifically, the current position of the user is acquired by a GPS device installed in the user terminal 30 and transmitted to the user information acquisition unit 112 via the network 40. The scheduled destination of the user is, for example, the scheduled destination estimated in the destination estimation unit 113 which will be described later. When using a vehicle allocation service according to the first embodiment, the user may submit activity schedule information to the system. For example, FIG. 6 illustrates an example of the activity schedule information indicating the activity schedule of the user as the user information. That is, the position of the user at a certain timing can be estimated on the basis of the activity schedule information, and the user information acquisition unit 112 may acquire the user position information indicating the position of the user on the basis of the activity schedule information.

The destination estimation unit 113 estimates a scheduled destination of the user using the baggage. Specifically, the destination estimation unit 113 estimates the scheduled destination on the basis of the position of the user at a certain timing and/or a scheduled destination to which the user is currently heading. For example, the destination estimation unit 113 estimates the scheduled destination on the basis of the position information of the user acquired by the user information acquisition unit 112. Alternatively, the destination estimation unit 113 may estimate the scheduled destination on the basis of the activity schedule information (schedule) indicating an activity schedule of the user as illustrated in FIG. 6. For example, as illustrated in FIG. 2, the scheduled destination of the user is estimated to be "point 3" at a certain timing (e.g. around 12:00), and the scheduled destination of the user is estimated to be "point 4" at a later timing (e.g. around 15:00).

The vehicle information acquisition unit 114 acquires the vehicle information that includes the vehicle position information indicating the position of the vehicle 20. Specifically, the vehicle information acquisition unit 114 acquires the vehicle position information by receiving the position information transmitted from the vehicle 20. The vehicle 20 is provided with a GPS device as described above, and the GPS device acquires the position information of the vehicle 20 and transmits the acquired position information to the controller of the electronic controller 200. The controller of the electronic controller 200 stores the position information of the vehicle 20 in the storage. In addition, the controller of the electronic controller 200 transmits the position information of the vehicle 20 stored in the storage to the server 10, at a prescribed timing.

The usage area specifying unit 115 specifies the usage area in which the baggage is to be used, based on the baggage information, and the user information or the vehicle information. In the first embodiment, a reference table associating the baggage information with an estimated usage place of the baggage is stored in the storage 120 in advance, thereby making it possible to specify the usage area on the basis of the reference table. In the first embodiment, the estimated usage place is an abstract place in which the baggage is estimated to be used. By using the storage 120 that associates the baggage with the estimated usage place, the usage area specifying unit 115 can narrow down the place where the baggage is to be used to some extent, thereby making it possible to specify the usage area more appropriately.

FIG. 5 illustrates an example of the reference table that associates the baggage information with an estimated usage place. The reference table illustrated in FIG. 5 illustrates an example in which the estimated usage place is registered as a "swimming beach" when, for example, the baggage is a "body board". In addition, FIG. 5 illustrates an example in which the estimated usage place is registered as a "swimming beach" and a "park" when, for example, the baggage is a "simple tent".

In the present embodiment, the usage area is specified on the basis of the estimated usage place, and the user information acquired by the user information acquisition unit 112 or the vehicle information acquired by the vehicle information acquisition unit 114. The user information about the user is specified, when the activity schedule information of the user has been acquired, on the basis of the acquired activity schedule information. For example, when the user acquires the information about stopping at "point 3" and "point 4" between 13:00 and 16:00, the usage area is specified as "point 3" and/or "point 4" from a "swimming beach" that is the estimated usage place.

The user information about the user may be related to the position information of the user, for example. In this case, for example, when the information is acquired that the position information of the user is in the vicinity of "point 3" and "point 4", the usage area is specified as "point 3" and "point 4" from a "swimming beach" that is the estimated usage place.

Further, for example, when the vehicle 20 is traveling in the vicinity of the estimated usage place, the estimated usage place may be specified as the usage area, on the basis of the vehicle information. For example, as illustrated in FIG. 2 above, when the vehicle 20 is traveling in the vicinity of "point 3" and "point 4", the usage area is specified as "point 3" and/or "point 4" which are/is a "swimming beach." In a case where the usage area is specified by using the position information of the user and when the vehicle 20 is not able to travel in the vicinity of the user due to traffic conditions or the like, it may be difficult for the user to converge with the vehicle 20 even when the user wishes to use the baggage. Therefore, when the user wishes to use the baggage, it is possible to control the vehicle 20 traveling in the vicinity of the user such that the vehicle 20 reliably converges with the scheduled destination of the user by specifying the usage area on the basis of the position information of the vehicle 20.

Figure 7:
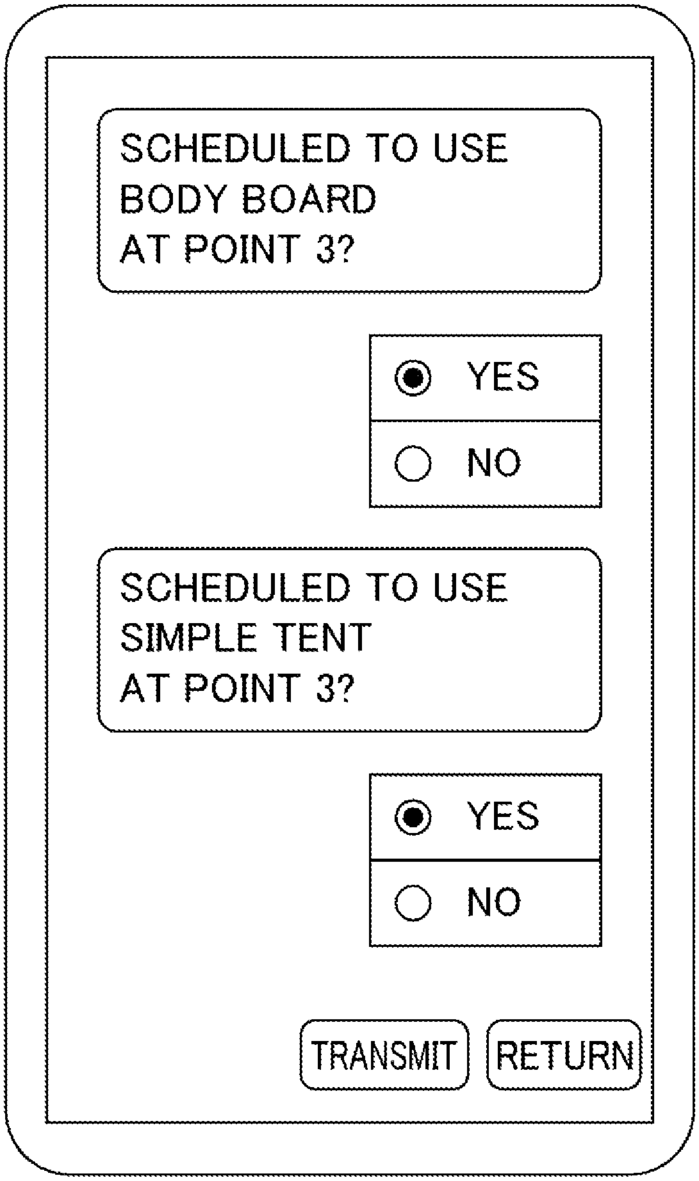
FIG. 7 is a diagram illustrating an example of an inquiry screen for a user according to the first embodiment.

The vehicle allocation determination unit 116 determines a vehicle allocation route for allocating the vehicle 20 to the destination on the basis of the positional relationship between the current position of the user or the scheduled destination of the user and the usage area. Specifically, for example, when the current position of the user or the scheduled destination of the user is included within a prescribed range from the specified usage area, the vehicle allocation determination unit 116 inquires with the user as to whether or not the baggage will be used at the current position or the scheduled destination. In the present embodiment, the prescribed range is, for example, a circular range within a radius of 1 km centered on the usage area. However, the prescribed range is not limited to a radius of 1 km, and the prescribed range may be shorter or longer than a radius of 1 km centered on the usage area. As for the inquiry with the user, the information as to whether or not the baggage will be used is transmitted to the user terminal 30 via the user interface (IF) unit 117. The information transmitted to the user terminal 30 is displayed on a screen as illustrated in FIG. 7, for example. The user responds to the inquiry information displayed on the user terminal 30 as to whether or not to the baggage will be used. The response made by the user is transmitted from the user terminal 30 to the server 10 via the network 40. The response from the user is transmitted to the vehicle allocation determination unit 116 from the server 10 via the network interface (IF) 140 and the user interface (IF) unit 117.

The vehicle allocation determination unit 116 determines a route according to the response from the user. When receiving a response from the user that the baggage will be used, the vehicle allocation determination unit 116 determines the vehicle allocation route for moving the vehicle 20 to the user. For example, routes A1 and A2 illustrated in FIG. 2 are applicable to the vehicle allocation route. In contrast, when receiving a response from the user that the baggage will not be used, the vehicle allocation determination unit 116 determines the vehicle allocation route considering the time allocation to the final destination without moving the vehicle 20 to the user. The vehicle allocation route in this case is, for example, route B illustrated in FIG. 2.

Further, when determining the vehicle allocation route for moving the vehicle 20 to the user, the vehicle allocation determination unit 116 determines the vehicle allocation route to the place where the vehicle 20 converges with the user, based on the user information. When the vehicle 20 converges with the user, the vehicle allocation determination unit 116 determines the vehicle allocation route based on the user information such that the vehicle 20 arrives at the convergence place (that is, the user's destination) at the time when the user is to arrive, or after arrival of the user. This prevents the vehicle 20 from consuming wasteful energy at the convergence place.

The vehicle allocation determination unit 116 notifies the user terminal 30 of the convergence information via the user interface (IF) unit 117. Here, the convergence information is, for example, where and when the user and the vehicle 20 converge with each other. In addition, the convergence information may include the baggage information about the baggage to be delivered to the user.

The vehicle instruction unit 118 transmits a control instruction corresponding to the vehicle allocation route, to the vehicle 20 to thereby control the vehicle 20. The electronic controller 200 of the vehicle 20 controls the traveling of the vehicle 20 according to the control instruction transmitted from the vehicle allocation support device 100.

(Outline of Processing Flow of Vehicle Allocation Support Device 100)

Figure 8:
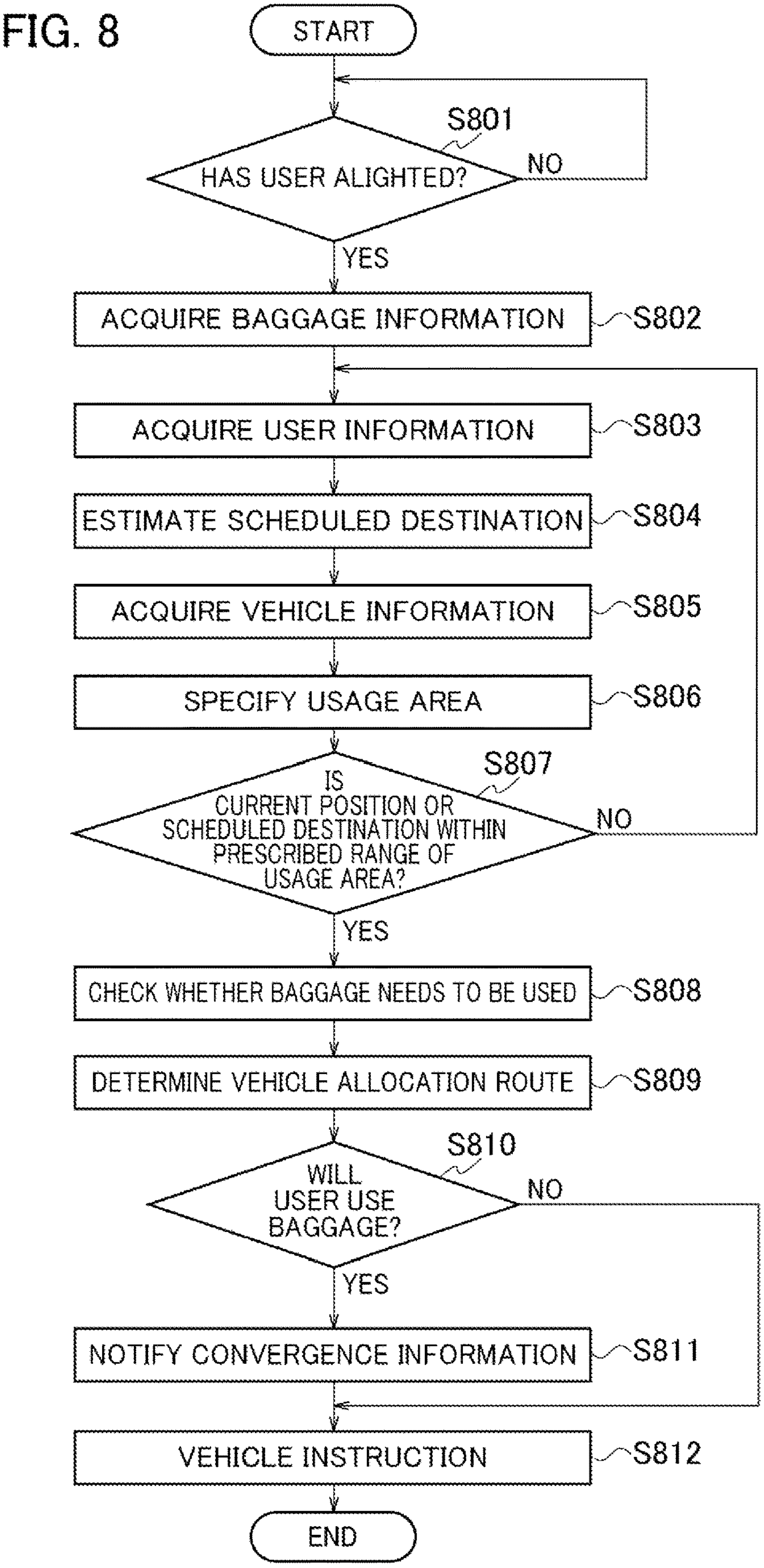
FIG. 8 is a flowchart for explaining the processing of the vehicle allocation support device 100 according to the first embodiment.

Next, the processing related to vehicle allocation support (vehicle allocation support method) in the vehicle allocation support device 100 will be described on the basis of the flowchart of FIG. 8. In the flowchart of FIG. 8, the processing also ends upon power-off or interruption of the completion of the processing. In the description of the flowchart below, content that is the same as that described in the vehicle allocation support device 100 described above will be omitted or described in a simplified manner.

In step S801, the vehicle allocation support device 100 determines whether or not the user has alighted. Specifically, the user who has alighted notifies the server 10 that the user has alighted through the user terminal 30, and the vehicle allocation support device 100 determines whether or not the user has alighted. The present invention is not limited to the configuration in which a notification is received from the user terminal 30, and may be, for example, a configuration in which a notification is received from the electronic controller 200 of the vehicle 20. Specifically, the vehicle allocation support device 100 may determine whether or not the user has alighted, on the basis of the information transmitted from the electronic controller 200 of the vehicle 20 indicating that the user has alighted. In this case, the electronic controller 200 may detect that the user has alighted, on the basis of a sensor (not illustrated) provided in the vehicle 20, and transmit the information indicating that the user has alighted to the server 10. Alternatively, the vehicle allocation support device 100 may detect that the user has alighted, on the basis of the user position information acquired by each of the user information acquisition unit 112 and the vehicle information acquisition unit 114, and the position information of the vehicle 20. In this case, when the user position is separated from the position of the vehicle 20, the vehicle allocation support device 100 detects that the user has alighted.

In step S801, when the vehicle allocation support device 100 determines that the user has alighted (step S801: YES), the processing proceeds to step S802. In contrast, in step S801, when the vehicle allocation support device 100 determines that the user has not alighted yet (step S801: NO), the processing returns to step S801. That is, in the flowchart illustrated in FIG. 8, the processing starts after the user has alighted.

In step S802, the baggage information acquisition unit 111 acquires the baggage information about the baggage carried in the vehicle 20.

In step S803, the user information acquisition unit 112 acquires the user information about the user. The user information is the information about the user using the baggage, and the user information acquisition unit 112 acquires the user information including at least the user position information indicating the current position of the user or the destination information indicating a scheduled destination of the user.

In step S804, the destination estimation unit 113 estimates the destination of the user using the baggage. Specifically, the destination estimation unit 113 estimates the scheduled destination on the basis of the position of the user at a certain timing and/or a scheduled destination to which the user is currently heading. For example, the destination estimation unit 113 estimates the scheduled destination on the basis of the position information of the user acquired by the user information acquisition unit 112. Alternatively, as described above, the destination estimation unit 113 may estimate the destination on the basis of the schedule illustrated in FIG. 6.

In step S805, the vehicle information acquisition unit 114 acquires the vehicle information that includes the vehicle position information indicating the position of the vehicle 20. Specifically, the vehicle information acquisition unit 114 acquires the vehicle position information by receiving the position information transmitted from the vehicle 20.

In step S806, the usage area specifying unit 115 specifies the usage area in which the baggage is to be used, based on the baggage information and the user information or the vehicle information. In the first embodiment, a reference table associating the baggage information with an estimated usage place of the baggage is stored in the storage 120 in advance, thereby making it possible to specify the usage area on the basis of the estimated usage place in the reference table and the user information or the vehicle information.

In step S807, the vehicle allocation determination unit 116 determines whether the current position of the user acquired by the user information acquisition unit 112, or the scheduled destination of the user estimated by the destination estimation unit 113 is within a prescribed range of the usage area specified by the usage area specifying unit 115. In step S807, when the vehicle allocation determination unit 116 has determined that the current position of the user or the scheduled destination of the user is within a prescribed range of the usage area (step S807: YES), the processing proceeds to step S808. In contrast, in step S807, when the vehicle allocation determination unit 116 has determined that the current position of the user or the scheduled destination of the user is not within a range of the usage area (step S807: NO), the vehicle allocation determination unit 116 returns to step S803 and repeats the processing from step S803 to step S807. That is, the processing from step S803 to step S807 is repeated until the current position of the user or the scheduled destination of the user is included within a prescribed range of the usage area. At a timing when the time during which the user is estimated to be within a prescribed range of the usage area has elapsed, the vehicle allocation determination unit 116 does not determine a vehicle allocation route to the destination of the user, but determines a vehicle allocation route to the final destination (not illustrated).

In step S808, the vehicle allocation determination unit 116 inquires with the user as to whether or not the baggage will be used. More specifically, the information to inquire whether or not the baggage will be used is transmitted to the user terminal 30, and an inquiry screen as illustrated in FIG. 7 is displayed on the user terminal 30. The user responds as to whether or not the baggage will be used, according to the inquiry information displayed on the user terminal 30. The present invention is not limited to the configuration that is executed in step S808. For example, when the user wishes to use the baggage in the scheduled destination, the user may transmit a request to use the baggage to the server 10 using the user terminal 30. In this case, the response that the baggage will be used described above corresponds to the request from the user to use the baggage, and processing with which the vehicle 20 converges with the user is executed from step S809 and thereafter.

In step S809, the vehicle allocation determination unit 116 determines the vehicle allocation route (allocation route) of the vehicle 20 on the basis of the response from the user. Specifically, the vehicle allocation determination unit 116 determines the vehicle allocation route to move the vehicle 20 to the user when receiving a response from the user terminal 30 that the baggage will be used. In contrast, when receiving a response from the user terminal 30 that the baggage will not be used, the vehicle allocation determination unit 116 determines the vehicle allocation route considering the time allocation to the final destination without moving the vehicle 20 to the user.

In step S810, the vehicle allocation determination unit 116 determines whether or not the user will use the baggage. In step S810, when the vehicle allocation determination unit 116 has determined that the user will use the baggage (step S810: YES), the processing proceeds to step S811. In contrast, in step S810, when the vehicle allocation determination unit 116 has determined that the user will not use the baggage (step S810: NO), the processing proceeds to step S812.

In step S811, the vehicle allocation determination unit 116 notifies (transmits) the convergence information for delivery of the baggage (place, time, baggage, etc.), to the user terminal 30 via the user interface (IF) unit 117.

In step S812, the vehicle instruction unit 118 transmits the determined allocation route to the vehicle 20. In accordance with the instruction from the vehicle instruction unit 118, the electronic controller 200 of the vehicle 20 controls the traveling of the vehicle 20 such that the vehicle 20 travels to a prescribed destination. By transmitting the determined allocation route from the vehicle instruction unit 118 to the vehicle 20 and controlling the traveling of the vehicle 20, this makes it possible to flexibly control the vehicle 20 according to the position of the user, the position of the vehicle 20, or the state of whether or not the baggage is to be received, thereby making it possible to perform vehicle allocation efficiently.

(Operational Effect)

As described above, the first embodiment makes it possible to achieve the following operational effects.

The vehicle allocation support device 100 includes the baggage information acquisition unit 111, the user information acquisition unit 112, the vehicle information acquisition unit 114, the usage area specifying unit 115, and the vehicle allocation determination unit 116. The baggage information acquisition unit 111 acquires the baggage information about the baggage carried in the vehicle. The user information acquisition unit 112 acquires the user information including at least the user position information indicating the current position of the user or the destination information indicating a scheduled destination of the user. The vehicle information acquisition unit 114 acquires the vehicle information that includes the vehicle position information indicating the position of the vehicle. The usage area specifying unit 115 specifies a usage area in which the baggage is to be used, based on the baggage information, and the user information or the vehicle information. The vehicle allocation determination unit 116 determines a vehicle allocation route for allocating the vehicle to at least the current position of the user, a scheduled destination of the user, or a usage area, based on the positional relationship between the current position of the user or the scheduled destination of the user, and the usage area. This allows the user to receive the baggage carried in the vehicle at a place where the user is to use the baggage when the user is likely to use the baggage, thus reducing the time and effort required to receive the baggage, thereby reducing wasteful energy consumption.

In addition, the vehicle allocation determination unit 116 determines the vehicle allocation route when the current position of the user or the scheduled destination of the user is within a prescribed range of the usage area. This allows the user to receive the baggage more quickly and efficiently, thus reducing the time and effort required to receive the baggage, thereby reducing wasteful energy consumption.

In addition, the vehicle allocation support device 100 includes the storage 120 that stores the baggage information by associating the baggage information with an estimated usage place indicating a place where the baggage is to be used. The usage area specifying unit 115 specifies a usage area based on the estimated usage place and the user information. By using the storage 120 that associates the baggage with the estimated usage place, the usage area specifying unit 115 can narrow down the place where the baggage is to be used to some extent, thereby making it possible to specify the usage area more appropriately.

In addition, the vehicle instruction unit 118 controls the vehicle 20 by transmitting a control instruction to the vehicle 20 such that the vehicle 20 travels along the vehicle allocation route. This makes it possible to flexibly control the vehicle 20 according to the position of the user, the position of the vehicle 20, or the state of whether or not the baggage is to be received, thereby making it possible to perform vehicle allocation efficiently.

In addition, when the user has not arrived at the destination, the vehicle allocation determination unit 116 predicts the time when the user is to arrive at the destination and determines the vehicle allocation route such that the vehicle arrives at the destination (convergence place) at the time when the user is to arrive, or after arrival of the user. This prevents the vehicle 20 from consuming wasteful energy at the convergence place.

In addition, the usage area specifying unit 115 specifies the usage area on the basis of the baggage information, and the vehicle position indicated by the vehicle position information. By specifying the usage area based on the vehicle position information, the vehicle 20 traveling in the vicinity of the user can reliably converge with the destination of the user when the user wishes to use the baggage.

Further, the user information may include the activity schedule information indicating the activity schedule of the user. By estimating the destination based on the activity schedule information, the destination estimation unit 113 can more accurately understand the activity of the user, thereby making it possible to estimate the destination appropriately.

Second Embodiment

As described above, the first embodiment has been specifically described, but the above-described first embodiment is an example and is not intended to limit the present invention. For example, in the above-described embodiment, the configuration of a vehicle allocation service has been described in which the use of baggage is proposed to a user heading to a scheduled destination on the way and the user can use the baggage on the way if necessary. Here, a different configuration from that of the first embodiment will be described for a vehicle allocation support system 1 according to a second embodiment in which a vehicle allocation support device 100 allocates a vehicle 20 by predicting a user who has entered a given area and the demand of the user.

Figure 9:
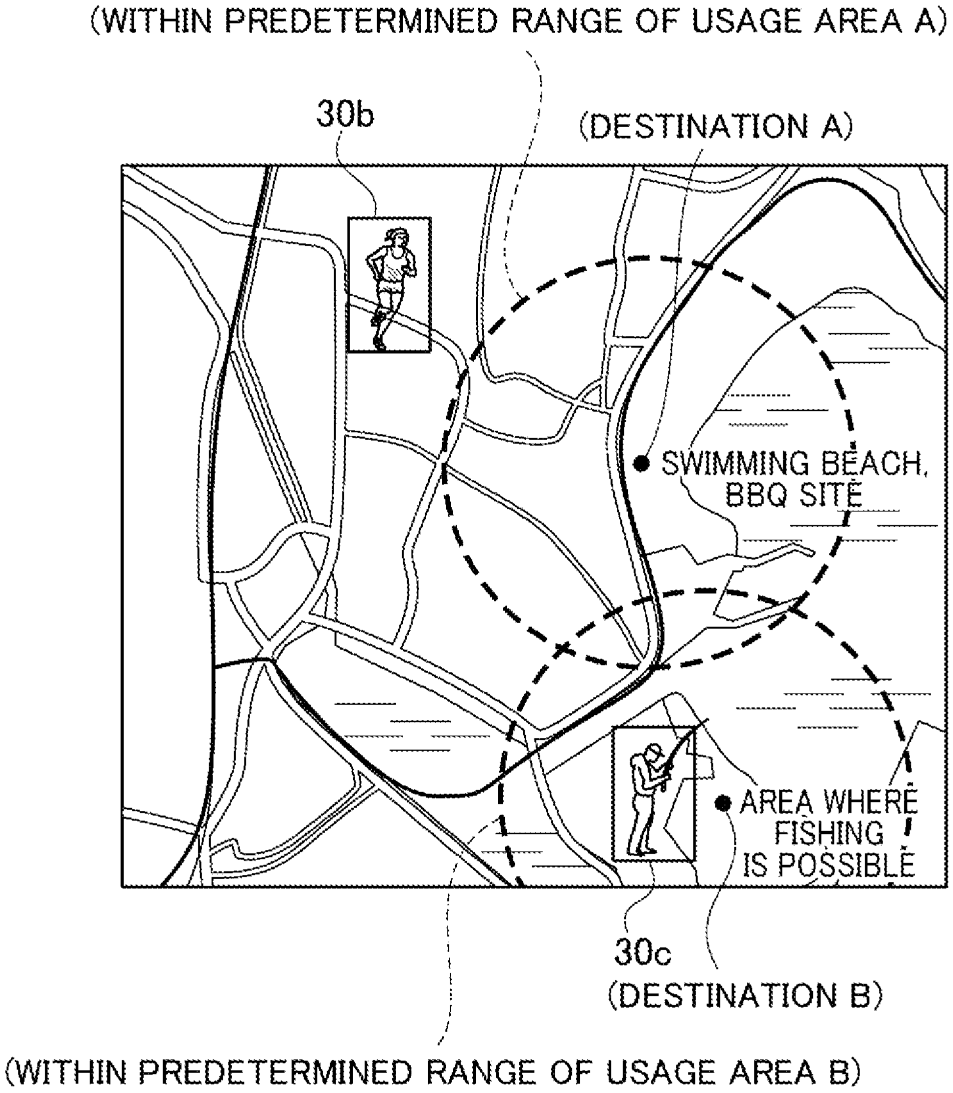
FIG. 9 is a diagram for explaining a vehicle allocation service according to a second embodiment.

FIG. 9 is a diagram for explaining a service using the vehicle allocation support device 100 according to the second embodiment. The service illustrated in FIG. 9 predicts a user who has entered a given area and the demand of the user, and allocates a vehicle 20 satisfying the demand of the user, to an appropriate place. In this respect, the vehicle 20 carries the baggage Also, on the basis of the position information of the vehicle 20 that provides the service, a plurality of usage areas where the user uses the service are specified, at least one user is detected within a prescribed range from the usage area, and the vehicle 20 is allocated to the usage area where the user is detected.

For example, FIG. 9 illustrates an example in which a user 30*b* is heading to a swimming beach along the coast, or to a BBQ site. In addition, FIG. 9 illustrates an example in which a user 30*c* is fishing in a fishing possible area that is a scheduled destination.

According to the sequence diagram illustrated in FIG. 10, an outline of the processing in the vehicle allocation support system 1 according to the second embodiment will be described. Here, the outline of the service in the vehicle allocation support system 1 according to the second embodiment will be described in association with the diagram of the example in FIG. 9.

In step S1001, the vehicle 20 transmits the baggage information about the baggage carried in the vehicle 20. As illustrated in FIG. 11, the vehicle 20 in the second embodiment is assumed to have prescribed baggage information about the baggage to be carried and prescribed estimated usage places about the baggage to be carried, according to the type of service.

FIG. 11 illustrates the baggage information according to the type of vehicle 20 in the second embodiment and the estimated usage places corresponding to the baggage information. For example, in the second embodiment, when the service vehicle is a sales vehicle, the baggage to be carried is food, lunch boxes, extra clothes, fishing baits, or the like. In addition, the estimated usage place of each baggage is a swimming beach, a BBQ site, a fishing spot, or the like.

In addition, when the service vehicle is a rental product supply vehicle, the baggage to be carried is parasols, swimsuits, floats, simple tents, shovels for shellfish gathering, or the like. In addition, as in the case of the above sales vehicle, the estimated usage place of each baggage includes a swimming beach, a BBQ site, fishing spot, or the like.

In the vehicle allocation support system 1 in the second embodiment, the vehicle allocation support device 100 predicts the demand of the user, and the vehicle 20 carries the baggage that is assumed to be required by the user to the intended destination to which the user is heading or to the point in which the user has already arrived (current position). In addition, the vehicle 20 sells or rents the baggage to the user in the intended destination.

In step S1002, user information is transmitted from the user terminal 30. The user information is the information about the user who is estimated to use the baggage, and at least includes the user position information indicating the position of the user or the destination information indicating a scheduled destination of the user. In the second embodiment, the user may use the service of the vehicle allocation support system 1, for example. In this case, for example, the user may apply in advance for use of the service and register the user information. Alternatively, the server 10 may be configured to collect usage history information, which is information indicating that the user has used this service in the past. In addition, in the second embodiment, the user information may include attribute information indicating the attributes of the user such as age and gender. The attribute information is, for example, the input information that is input by the user in the user terminal 30. Alternatively, the attribute information may be acquired by, for example, a vehicle sensor.

In step S1003, the server 10 estimates the scheduled destination of the user based on the user information. For example, as for the destination of the user in the example illustrated in FIG. 9, "destination A" is estimated as the scheduled destination for the user 30*b* and "destination B" is estimated as the scheduled destination for the user 30*c*. Here, the user information used for the estimation of the scheduled destination is the activity schedule information indicating the activity schedule of the user, the usage history information indicating the usage history of the user's past service, or the like. In the second embodiment, the activity schedule information and the usage history information are input in advance by the user by using the user terminal 30. In addition, the user information may be such that, for example, a place to which the user is heading is estimated from the position information of the user, and the place is estimated as the scheduled destination.

In step S1004, the vehicle 20 transmits the position information of the vehicle 20 to the server 10. The position information of the vehicle 20 is transmitted to the server 10 at prescribed intervals. In addition, the position information of the vehicle 20 may be transmitted before the notification of the baggage information that is executed in step S1001, for example.

In step S1005, the server 10 specifies a usage area of the baggage carried in the vehicle 20. In the second embodiment, a usage area is specified on the basis of the estimated usage place that is estimated according to the baggage, and the user information about the user or the vehicle information. The user information about the user is specified on the basis of the activity schedule information when the activity schedule information of the user is acquired. For example, as illustrated in FIG. 9, when the information indicating that the user 30*b* is heading to "destination A" is acquired, the usage area A indicating the area of "swimming beach" or "BBQ site" is specified as the usage area. In the example illustrated in FIG. 9, when the information indicating that the user 30*c* is going to fish at "destination B" is acquired, the usage area B indicating the area of "fishing spot" is specified as the usage area.

In step S1006, the server 10 checks with the user terminal 30 whether or not to use the baggage. For example, as illustrated in FIG. 9, the server 10 inquires as to whether or not the user 30*b* needs a "lunch box" in a "beach". Further, in the example of FIG. 9, the server 10 inquires as to whether the user 30*c* needs a "parasol" in a "fishing spot."

In step S1007, a response as to whether or not the user will use the baggage is transmitted from the user terminal 30.

In step S1008, the server 10 notifies the user terminal 30 of convergence information. Here, the convergence information is, for example, where and when the user and the vehicle 20 converge with each other. In addition, the convergence information may include the baggage information about the baggage to be delivered to the user. The convergence information is notified in step S1008 when the user responds in step S1007 that the user wishes to use the baggage. Therefore, when the user responds in step S1008 that the user does not wish to use the baggage, the processing of step S1008, and step S1010 which will be described later are not executed.

In step S1009, the server 10 transmits a route to the convergence place with the user, to the vehicle 20. For example, as illustrated in FIG. 9, the route information to the destination A is transmitted to the vehicle 20. The route information may not be transmitted in step S1009 when the user responds in step S1008 that the user does not wish to use the baggage.

In step S1010, the user terminal 30 transmits a notification to the server 10 that the user has received the baggage at the place where the user has converged with the vehicle 20. For example, as illustrated in FIG. 9, a notification indicating that the user has purchased a target product from the sales vehicle or received a rental product from the rental product supply vehicle is transmitted.

Figure 10:
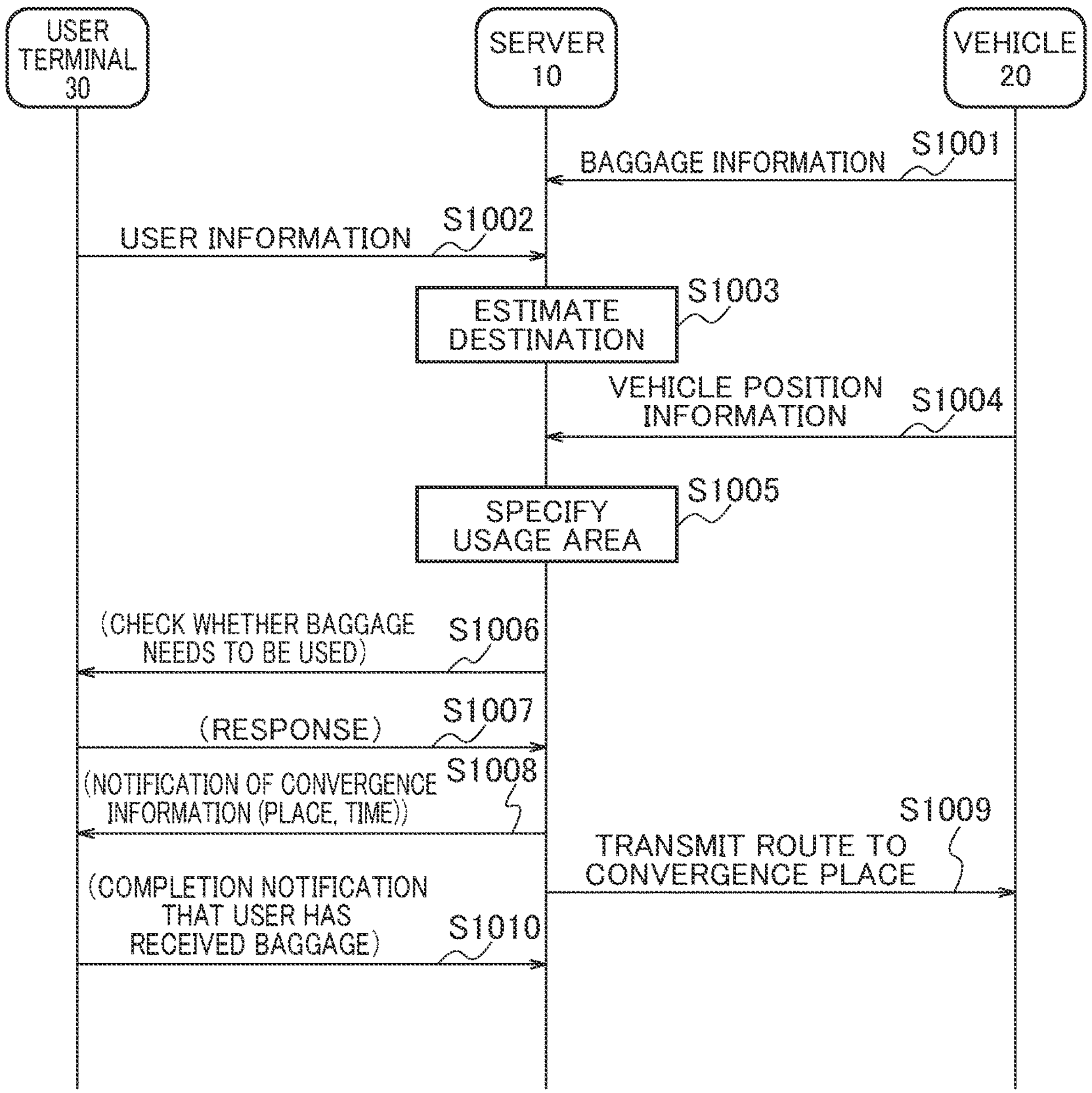
FIG. 10 is a sequence diagram for explaining the processing of a vehicle allocation support system 1 according to the second embodiment.

In FIG. 10, the processing executed in steps S1006 to S1008 and the processing executed between the server 10 and the user terminal 30 in step S1010 may be optional, and it is possible not to perform the above processing. For example, after the server 10 estimates a destination in step S1005 executed by the server 10, a route to the destination executed in step S1009 may be transmitted to the vehicle 20 without checking with the user, and the vehicle 20 may travel to the destination. For example, when a plurality of destinations are estimated in a case where there are a plurality of target users, the server 10 may be configured to control the vehicle 20 such that the vehicle 20 preferentially travels to the destination where there is a great number of target users, without using the response from the user for determining the vehicle allocation route. Further, for example, the server 10 may be configured to control the vehicle 20 such that the vehicle 20 travels via a point with a great number of users and then travels via a point with a small number of users. This makes it possible for the vehicle allocation determination unit 116 to determine an efficient allocation route.

(Outline of Processing Flow of Vehicle Allocation Support Device 100)

Figure 12:
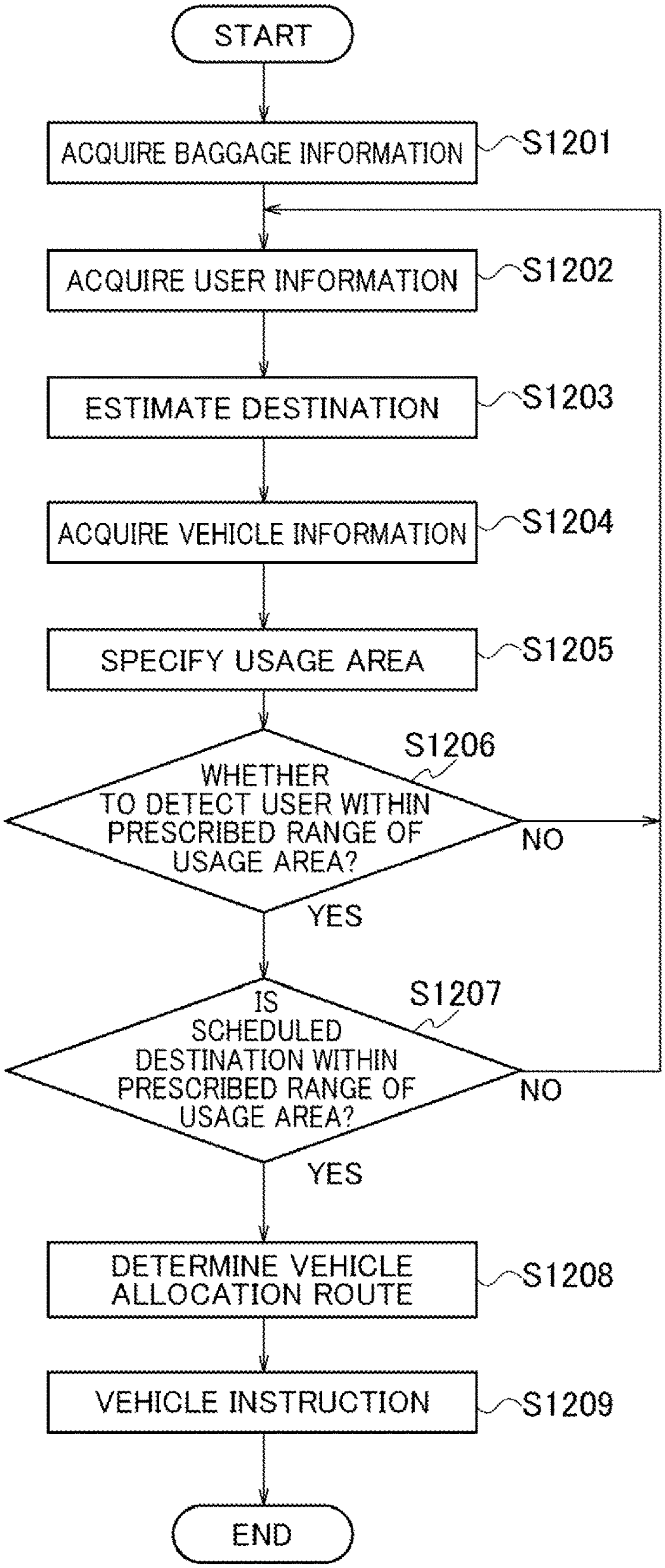
FIG. 12 is a flowchart for explaining the processing of a vehicle allocation support device 100 according to the second embodiment.

Next, the processing related to vehicle allocation support (allocation support method) in the second embodiment will be described with reference to a flowchart of FIG. 12. In the flowchart of FIG. 12, the processing also ends upon power-off or interruption of the completion of the processing. In the description of the flowchart below, content that is the same as that in the description of the sequence diagram illustrated in FIG. 10 above will be omitted or described in a simplified manner.

In step S1201, the baggage information acquisition unit 111 acquires the baggage information. Specifically, the baggage information acquisition unit 111 acquires the baggage information by inputting and registering the baggage that is carried in advance among the baggage corresponding to the service vehicle, as illustrated in FIG. 11.

In step S1202, the user information acquisition unit 112 acquires the user information about the user. The user information is the information about the user who is assumed to use the baggage, and the user information acquisition unit 112 acquires the user information including at least the user position information indicating the current position of the user or the destination information indicating a scheduled destination of the user. The user information acquisition unit 112 in the second embodiment may also acquire the user information by using the activity schedule information (schedule) about a specific user or the past travel history information about a specific user. In addition, the user information may include the usage history information, which is the information indicating that the user has used this service in the past, or the attribute information indicating the attributes of the user such as age and gender. Such user information may be, for example, the registration information that the user has registered when applying for use of the service in advance. In addition, the user information may be the input information input by the user in the user terminal 30, for example. In addition, the attribute information may be, for example, the detection information detected by a vehicle sensor or the detection information detected by an infrastructure device such as a camera installed on a road or the like. The user information detected by an infrastructure device may be acquired not from the user terminal 30 but directly from the infrastructure device, or may be acquired by the same server as the server 10 or a different server from the server 10 via the infrastructure device.

In step S1203, the destination estimation unit 113 estimates the destination of the user using the baggage. Specifically, the destination estimation unit 113 estimates the scheduled destination on the basis of the current position of the user at a certain timing and/or a scheduled destination to which the user is currently heading. For example, the destination estimation unit 113 estimates the scheduled destination on the basis of the position information of the user acquired by the user information acquisition unit 112. In addition, the destination estimation unit 113 may estimate the scheduled destination on the basis of the user information. The user information used for estimating the scheduled destination may be, for example, the activity schedule information of the user, the usage history information of the user, or the attribute information of the user.

In step S1204, the vehicle information acquisition unit 114 acquires the vehicle information that includes the vehicle position information indicating the position of the vehicle 20. Specifically, the vehicle information acquisition unit 114 acquires the vehicle position information by receiving the position information transmitted from the vehicle 20.

In step S1205, the usage area specifying unit 115 specifies a usage area. Specifically, the usage area specifying unit 115 specifies the usage area, on the basis of the user information of the target user or the vehicle information of the target user and the usage estimated place estimated by the baggage information. For example, as illustrated in FIG. 9, on the basis of the position information of the target user 30*b*, it is determined that the target user 30*b* is heading to a "swimming beach" of the destination A. Further, in a case where the vehicle 20 is a sales vehicle illustrated in FIG. 11 and carries a "lunch box" as the baggage, the usage area is specified as the "swimming beach" in the usage area A.

Further, in the example illustrated in FIG. 9, on the basis of the position information of the target user 30*c*, it is determined that the target user 30*c* is positioned in a "fishing spot" of the destination B. Furthermore, when the vehicle 20 carries a "parasol" as the baggage among the rental products illustrated in FIG. 11, the usage area is specified as the "fishing spot" of the usage area B.

In step S1206, the user information acquisition unit 112 determines whether or not to detect the user in the usage area. In step S1206, when the user information acquisition unit 112 has determined that the user is detected in the usage area (step S1206: YES), the processing proceeds to step S1207. In contrast, in step S1206, when the user information acquisition unit 112 has determined that the user is not detected in the usage area (step S1206: NO), the processing returns to step S1202.

For example, as illustrated in FIG. 9, since the user 30*b* has not reached the usage area A, it is determined in step S1206 that the user is not detected in the usage area, and the processing returns to step S1202. In contrast, since the user 30*c* is positioned within the usage area B, it is determined in step S1206 that the user is detected in the usage area, and the processing proceeds to step S1207. In determining whether or not the user is detected within the usage area that is executed in step S1206, it may be determined whether or not at least one user using the service according to the second embodiment is within the usage area.

In step S1207, the vehicle allocation determination unit 116 determines whether or not the scheduled destination is within a prescribed range of the usage area. In step S1207, when the vehicle allocation determination unit 116 has determined that the scheduled destination is within a prescribed range of the usage area (step S1207: YES), the processing proceeds to step S1208. In contrast, in step S1207, when the vehicle allocation determination unit 116 has determined that the current position of the user or the scheduled destination of the user is not within a prescribed range of the usage area (step S1207: NO), the processing returns to step S1202 to acquire the user information.

For example, as illustrated in FIG. 9, when the scheduled destination of the user 30*b* is the destination B that is the "fishing spot", the processing returns to step S1202 to acquire the user information again because the destination B is not within the prescribed range of the usage area A specified in step S1203.

In step S1208, the vehicle allocation determination unit 116 determines a vehicle allocation route. Specifically, the vehicle allocation determination unit 116 determines the vehicle allocation route such that the vehicle 20 travels to the current position of the user, the scheduled destination of the user, or the usage area. The vehicle allocation route determined in step S1208 may include information about the timing at which the user is to arrive at the scheduled destination. For example, when the user information acquisition unit 112 acquires the user information of the user using the vehicle allocation support service according to the second embodiment, the vehicle allocation route may be determined such that the vehicle 20 arrives at the scheduled destination according to the timing at which the user is to arrive at the scheduled destination. Further, when the user information acquisition unit 112 acquires the user information about a plurality of users who use the vehicle allocation support service according to the second embodiment, the vehicle allocation route may be determined in accordance with the destination where there is a great number of target users. In addition, when the user information acquisition unit 112 acquires the user information about a plurality of users, the vehicle allocation route may be determined according to the timing at which a certain number of users are to arrive at the scheduled destination. In addition, the vehicle allocation determination unit 116 may determine a vehicle allocation route on the basis of a distance from the vehicle 20 determined by the vehicle position information acquired in the vehicle information acquisition unit 114 to the current position of the user or a scheduled destination of the user. For example, the vehicle 20 travels via a point nearby where the user is positioned and then via a certain (single) distant destination for the user, thereby making it possible to determine an efficient vehicle allocation route.

Further, the vehicle allocation determination unit 116 may determine a vehicle allocation route to a scheduled destination on the basis of the usage history information of the user. For example, the vehicle allocation determination unit 116 may determine the vehicle allocation route to the scheduled destination when determining that the user has not used the target baggage in the estimated scheduled destination within a prescribed time. This is because, for example, when the vehicle 20 is a sales vehicle illustrated in FIG. 11 and carries a "lunch box" as the baggage, it is estimated that the user who has purchased the "lunch box" from the sales vehicle is unlikely to purchase a lunch box again within the prescribed time. The prescribed time varies depending on a type of the baggage, and for example, when the baggage is a "lunch box", the prescribed time may be set as one day. This makes it possible to suppress the allocation of the vehicle 20 to, for example, the user who is unlikely to purchase products, thereby reducing wasteful energy consumption of the vehicle 20.

Further, the vehicle allocation determination unit 116 may determine a vehicle allocation route to a scheduled destination on the basis of the attribute information of the user. For example, when the user is, for example, in his/her teens or twenties, and the baggage carried in the vehicle 20 is a product or a rental item that is intended for a younger generation, the vehicle allocation determination unit 116 may determine the vehicle allocation route for these users. This makes it possible to allocate the vehicle 20 to the users who are likely to purchase or rent products, thereby improving the efficiency of vehicle allocation.

In step S1209, the vehicle instruction unit 118 transmits the determined allocation route to the vehicle 20. In accordance with the instruction from the vehicle instruction unit 118, the electronic controller 200 of the vehicle 20 controls the traveling of the vehicle 20 such that the vehicle 20 travels to a prescribed destination.

(Operational Effect)

As described above, the second embodiment makes it possible to achieve the following operational effects.

The vehicle allocation support device 100 according to the second embodiment predicts the demand of the user based on the user information, and allocates the vehicle 20 to the destination where the user is likely to use (purchase or rent) the baggage carried in the vehicle 20. As a result, the vehicle 20 can be allocated appropriately according to the demand of the user, and the sales vehicle or the rental supply vehicle can efficiently sell or provide rental products in the appropriate destination, thereby reducing wasteful energy consumption of the vehicle 20 to reach the destination.

In addition, when a plurality of destinations are estimated in a case where there are a plurality of users, the vehicle allocation determination unit 116 according to the second embodiment determines a vehicle allocation route on the basis of the number of users or a distance from the vehicle to the destination. This makes it possible, for example, to preferentially allocate the vehicle 20 to a place where there is a greater number of users, thereby making it possible to sell products or provide rental products efficiently. In addition, the vehicle allocation determination unit 116 may determine a vehicle allocation route on the basis of a distance from the vehicle 20 determined by the vehicle position information acquired in the vehicle information acquisition unit 114 to the current position of the user or a scheduled destination of the user. For example, the vehicle 20 travels via a point nearby where the user is positioned and then via a certain (single) distant destination for the user, thereby making it possible to determine an efficient vehicle allocation route.

The user information in the second embodiment may be the usage history information of the user in relation to the vehicle 20. In this case, the destination estimation unit 113 may estimate a destination according to the usage history information. The destination estimation unit 113 estimates the destination based on the usage history information, which is the information when the user has used the service in the past, thereby making it possible to estimate the destination with higher accuracy in consideration of the tendency of the user.

Further, the vehicle allocation determination unit 116 may determine the vehicle allocation route based on the usage history information, when determining that the user has not used the baggage in the destination within a prescribed time. This makes it possible to suppress the allocation of the vehicle 20 to, for example, the user who is unlikely to purchase products, thereby reducing wasteful energy consumption of the vehicle 20.

In addition, the user information in the second embodiment may include the attribute information indicating the attributes of the user. The destination estimation unit 113 may estimate the destination based on the attribute information. This makes it possible to allocate the vehicle 20 to the user who is likely to purchase or rent products, thereby improving the efficiency of vehicle allocation.

Further, the attribute information may include at least one of the input information input by the user, the detection information detected by a vehicle sensor or an infrastructure device, and the registration information registered in advance. This makes it possible to acquire more detailed attribute information of the user, and for the vehicle allocation determination unit 116 to determine an allocation route more appropriately.

Other Embodiments

The embodiments of the present invention have been described above, but the statements and drawings forming part of this disclosure should not be understood as limiting the invention. Various alternative embodiments, examples, and operating techniques will be apparent to those skilled in the art from this disclosure.

In the above embodiments, an example of the vehicle 20 as an autonomous vehicle has been given, but the present invention is not limited to the above the embodiments. For example, the vehicle 20 may be driven by the driver according to an instruction for a vehicle allocation route transmitted from server 10.

A computer program (vehicle allocation support program) that causes a computer to execute the vehicle allocation support method described above and a computer-readable recording medium in which the program is recorded are included in the scope of the present embodiments. In this respect, the type of recording medium that the computer can read is optional. In addition, the computer program described above is not limited to those recorded on the recording medium described above, and may be transmitted via a telecommunication line, a wireless or a wired communication line, a network represented by the Internet, or the like.

REFERENCE SIGNS LIST

1 Vehicle allocation support system
10 Server
20 Vehicle
30 User terminal
40 Network
100 Vehicle allocation support device
110 Controller
111 Baggage information acquisition unit
112 User information acquisition unit
113 Destination estimation unit

114 Vehicle information acquisition unit
115 Usage area specifying unit
116 Vehicle allocation determination unit
117 User IF unit
118 Vehicle instruction unit
120 Storage
130 Input/output IF
140 Network IF

The invention claimed is:

1. A vehicle allocation support device comprising:

a baggage information acquisition unit configured to acquire baggage information about baggage carried in a vehicle;

a user information acquisition unit configured to acquire user information that is information about a user and includes at least user position information indicating a current position of the user or destination information indicating a scheduled destination of the user;

a vehicle information acquisition unit configured to acquire vehicle information that includes vehicle position information indicating a position of the vehicle;

a usage area specifying unit configured to specify a usage area in which the baggage is to be used, based on an estimated usage place that is information corresponding to the baggage and in which the baggage is estimated to be used and one of the user information and the vehicle information; and a vehicle allocation determination unit configured to determine a vehicle allocation route for allocating the vehicle to at least the current position of the user, the scheduled destination of the user, or the usage area, based on a positional relationship between the usage area and one of the user position information and the scheduled destination information.

2. The vehicle allocation support device according to claim 1, wherein the vehicle allocation determination unit is configured to determine the vehicle allocation route upon the current position of the user or the scheduled destination of the user being within a prescribed range of the usage area.

3. The vehicle allocation support device according to claim 1, further comprising: a vehicle instruction unit configured to control the vehicle by transmitting a control instruction to the vehicle such that the vehicle travels along the vehicle allocation route.

4. The vehicle allocation support device according to claim 1, wherein, upon the user having not arrived at the scheduled destination, the vehicle allocation determination unit is configured to predict a time when the user is to arrive at the scheduled destination, and determine the vehicle allocation route such that the vehicle arrives at the scheduled destination at the time when the user is to arrive or after arrival of the user.

5. The vehicle allocation support device according to claim 1, wherein, when the user includes a plurality of users and the scheduled destination includes a plurality of scheduled destinations estimated, the vehicle allocation determination unit is configured to determine the vehicle allocation route based on a number of the plurality of users or distances from the vehicle to the plurality of scheduled destinations.

6. The vehicle allocation support device according to claim 1, wherein the usage area specifying unit is configured to specify the usage area based on the baggage information and the position of the vehicle indicated by the vehicle position information.

7. The vehicle allocation support device according to claim 1, further comprising a destination estimation unit configured to estimate the scheduled destination of the user, wherein the user information further includes usage history information of the user for the vehicle, and the destination estimation unit is configured to estimate the scheduled destination based on the usage history information.

8. The vehicle allocation support device according to claim 7, wherein the vehicle allocation determination unit is configured to determine the vehicle allocation route based on the usage history information upon determining that the user has not used the baggage at the scheduled destination within a prescribed time.

9. The vehicle allocation support device according to claim 7, wherein the user information further includes activity schedule information indicating an activity schedule of the user, and the destination estimation unit is configured to estimate the scheduled destination based on the activity schedule information.

10. The vehicle allocation support device according to claim 7, wherein the user information further includes attribute information indicating attributes of the user, and the destination estimation unit is configured to estimate the scheduled destination based on the attribute information.

11. The vehicle allocation support device according to claim 10, wherein the attribute information includes at least one of input information input by the user, detection information detected by a vehicle sensor or an infrastructure device, and registration information registered in advance.

12. The vehicle allocation support device according to claim 1, wherein the vehicle allocation determination unit is configured to:

upon determining that the current position of the user or the scheduled destination of the user is within a prescribed range of the usage area, transmit information to inquire whether or not the baggage will be used to a user terminal of the user; and upon receiving a response from the user terminal that the baggage will be used by the user, determine the vehicle allocation route for allocating the vehicle to at least the current position of the user, the scheduled destination of the user, or the usage area, based on the positional relationship between the usage area and one of the user position information and the scheduled destination information.

13. The vehicle allocation support device according to claim 1, wherein the vehicle allocation determination unit is configured to:

upon determining that the current position of the user or the scheduled destination of the user is within a prescribed range of the usage area, transmit information to inquire whether or not the baggage will be used to a user terminal of the user;

upon receiving a response from the user terminal that the baggage will be used by the user, determine the vehicle allocation route for allocating the vehicle to at least the current position of the user, the scheduled destination of the user, or the usage area, based on the positional relationship between the usage area and one of the user position information and the scheduled destination information; and upon receiving a response from the user terminal that the baggage will not be used by the user, determine a vehicle allocation route for allocating the vehicle to a final destination of the baggage.

14. A vehicle allocation support method executed by a computer, the method comprising;

acquiring baggage information about baggage carried in a vehicle;

acquiring user information that is information about a user and includes at least user position information indicating a current position of the user or destination information indicating a scheduled destination of the user;

acquiring vehicle information that includes vehicle position information indicating a position of the vehicle;

specifying a usage area in which the baggage is to be used, based on an estimated usage place that is information corresponding to the baggage and in which the baggage is estimated to be used and one of the user information and the vehicle information; and determining a vehicle allocation route for allocating the vehicle to at least the current position of the user, the scheduled destination of the user, or the usage area, based on a positional relationship between the usage area and one of the user position information and the scheduled destination information.

15. A non-transitory computer-readable storage medium storing a vehicle allocation support program that, when executed on a processor, cause the processor to perform steps comprising:

acquiring baggage information about baggage carried in a vehicle;

acquiring user information that is information about a user and includes at least user position information indicating a current position of the user or destination information indicating a scheduled destination of the user;

acquiring vehicle information that includes vehicle position information indicating a position of the vehicle;

specifying a usage area in which the baggage is to be used, based on an estimated usage place that is information corresponding to the baggage and in which the baggage is estimated to be used and one of the user information and the vehicle information; and determining a vehicle allocation route for allocating the vehicle to at least the current position of the user, the scheduled destination of the user, or the usage area, based on a positional relationship between the usage area and one of the user position information and the scheduled destination information.

* * * * *